United States Patent
Yoshida et al.

(10) Patent No.: US 9,481,328 B2
(45) Date of Patent: Nov. 1, 2016

(54) WIRE HARNESS

(71) Applicant: Yazaki Corporation, Minato-ku, Tokyo (JP)

(72) Inventors: Hiroyuki Yoshida, Makinohara (JP); Hideomi Adachi, Makinohara (JP); Tatsuya Oga, Makinohara (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 14/903,675

(22) PCT Filed: Jun. 30, 2014

(86) PCT No.: PCT/JP2014/067471
§ 371 (c)(1),
(2) Date: Jan. 8, 2016

(87) PCT Pub. No.: WO2015/005173
PCT Pub. Date: Jan. 15, 2015

(65) Prior Publication Data
US 2016/0167601 A1    Jun. 16, 2016

(30) Foreign Application Priority Data
Jul. 8, 2013  (JP) .................................. 2013-142289

(51) Int. Cl.
*H01B 7/00*    (2006.01)
*H01B 11/06*   (2006.01)
(Continued)

(52) U.S. Cl.
CPC ......... *B60R 16/0215* (2013.01); *H01B 7/0045* (2013.01); *H02G 3/0487* (2013.01)

(58) Field of Classification Search
CPC ............ B60R 16/0215; H01B 7/0045; H02G 3/0487

USPC .................................................. 174/36, 72 A
See application file for complete search history.

(56) References Cited

U.S. PATENT DOCUMENTS 2,391,037 A * 12/1945 Shafer, Jr. ................ H01B 7/22
                                                                174/102 R
4,406,914 A    9/1983 Kincaid
(Continued)

FOREIGN PATENT DOCUMENTS

JP    H10-173385 A    6/1998
JP    2007-311233 A   11/2007
(Continued)

OTHER PUBLICATIONS

Aug. 12, 2014—International Search Report—Intl App PCT/JP2014/067471.
(Continued)

*Primary Examiner* — Sherman Ng
(74) *Attorney, Agent, or Firm* — Banner & Witcoff, Ltd.

(57) ABSTRACT

A wire harness (9) includes two high-voltage conducting paths (15), an exterior member (16) which receives and protects the high-voltage conducting paths (15), and a metal foil shield member (17) which covers and shields the high-voltage conducting paths (15) collectively. The metal foil shield member (17) includes a flexible sheet-like shield member body (18), and a retention member (19) which is used after the shield member body (18) is wrapped around the high-voltage conducting paths (15). A plurality of slits 23 are formed in the shield member body (18). The numerous slits (23) are disposed in places so as not to overlap with each other vertically when the shield member body (18) is wrapped around the two high-voltage conducting paths (15) twice.

2 Claims, 3 Drawing Sheets

(51) Int. Cl.
 *B60R 16/02* (2006.01)
 *H02G 3/04* (2006.01)

(56) References Cited

U.S. PATENT DOCUMENTS

| | | | |
|---|---|---|---|
| 6,740,808 | B1 | 5/2004 | Chang |
| 7,554,038 | B2 | 6/2009 | Oga et al. |
| 2007/0267208 | A1* | 11/2007 | Oga .................. H01B 11/1008 174/34 |
| 2010/0212952 | A1* | 8/2010 | Abdelmoula .......... H01B 1/026 174/390 |
| 2013/0112473 | A1 | 5/2013 | Toyama et al. |
| 2014/0360771 | A1* | 12/2014 | Itani ..................... H05K 9/0098 174/354 |

FOREIGN PATENT DOCUMENTS

| | | |
|---|---|---|
| JP | 2012-029385 A | 2/2012 |
| JP | 2012-038637 A | 2/2012 |

OTHER PUBLICATIONS

Aug. 12, 2014—(WO) Written Opinion—App PCT/JP2014/067471.

* cited by examiner

US 9,481,328 B2

WIRE HARNESS

TECHNICAL FIELD

The present invention relates to a wire harness which includes a conducting path, a shield member and an exterior member

BACKGROUND ART

In the background art, for example, an inverter unit and a battery which are mounted in a hybrid car or an electric car are electrically connected to each other through a wire harness. The wire harness includes a thick high-voltage conducting path, a braided shield member which covers the high-voltage conducting path, and an exterior member which is disposed on an outer side of the braided shield member. In such a wire harness, the braided shield member is provided in order to prevent a peripheral device from malfunctioning due to noise radiated from the high-voltage conducting path. The braided shield member is a shield member including a well-known braid.

The braid in the braided shield member is constituted by strands whose number is, for example, as high as 300. Therefore, there is a problem that the braid may be a relatively heavy member. In addition, when weight reduction is regarded as important, the mesh size of the braid becomes larger. Therefore, there is a problem that an excellent shielding effect cannot be obtained. Accordingly, it can be said that the braided shield member has a limit in weight reduction while securing the shielding effect.

To solve the problems, a technique disclosed in the following Patent Literature 1 becomes effective. In the following Patent Literature 1, a metal foil shield member is used in place of the braided shield member. The metal foil shield member has a metal foil and a base on which the metal foil is pasted. The metal foil shield member is formed into a sheet shape. The metal foil shield member is wrapped in a butt wrapping manner so that one side end portion of the metal foil shield member can be joined to the other side end portion of the metal foil shield member. At the same time, the metal foil shield member is formed into a cylindrical shape in the wrapping manner.

CITATION LIST

Patent Literature

Patent Literature 1: JP-A-2012-29385

SUMMARY OF INVENTION

Technical Problem

There is an advantage that the metal foil shield member according to the background art can achieve weight reduction while securing the shielding effect due to the metal foil. However, the metal foil is inferior in extensibility because the metal foil is not formed as braided strands like a braid. Therefore, there is a problem that the metal foil may affect bendability of the wire harness.

According to a conceivable solution to the problem, slits are provided in the metal foil to give extensibility to the metal foil. When the slits are opened due to bending of the wire harness in the case of the solution, the high-voltage conducting path is exposed from the opened slits. Therefore, there is a problem that in a part where the opening of each slit increases, the shielding effect may deteriorate due to the opening part.

The invention has been accomplished in consideration of the aforementioned circumstances. An object of the invention is to provide a wire harness which can maintain a shielding effect even when the wire harness is bent.

Solution to Problem

According to the invention which has been accomplished in order to solve the problem, there is provided a wire harness including: a conducting path; and a shield member that covers and shields the conducting path; wherein: the shield member includes a metal foil having a plurality of slits and the shield member being wrapped around the conducting path at least twice to cover the conducting path, and the plurality of slits are disposed in positions so as not to overlap with each other in a state that the shield member covers the conducting path.

According to the invention having such a configuration, the shielding effect can be maintained satisfactorily by the structure of the shield member even when the wire harness is bent. That is, the metal foil alone or the shield member including the metal foil (hereinafter referred to as metal foil shield member) is used, and the plurality of slits are provided in the metal foil shield member. Further, the metal foil shield member is wrapped at least twice with an arrangement in which the plurality of slits do not overlap with each other. In this manner, even if, for example, the slits in an outer-layer metal foil part of the doubly wrapped metal foil are opened when the wire harness is bent, the slits in an inner-layer metal foil part can be prevented from being located in the same positions as the opened slits. Accordingly, the conducting path can be prevented from being exposed even when the slits of the metal foil are opened. Thus, deterioration of shielding performance can be prevented.

In addition, each of the plurality of slits may be formed into a cut shape which is opened in response to a bending of the wire harness.

According to the invention having such a configuration, each of the plurality of slits is formed into a cut shape. Thus, the conducting path is not exposed in a state that the wire harness is not bent. Consequently, deterioration of shielding performance can be prevented in any state of the wire harness.

Advantageous Effects of Invention

According to the invention, there is obtained an effect that a shielding effect can be maintained even when the wire harness is bent. In addition, there is obtained an effect that the conducting path can be surely prevented from being exposed in the shield member even when the wire harness is bent.

DESCRIPTION OF EMBODIMENT

A wire harness includes one conducting path or a plurality of conducting paths, and a shield member which covers and shields the conducting path or paths. The wire harness is long enough to pass along a vehicle underfloor. The shield member includes a metal foil alone which has a plurality of slits each formed into a cut shape, or includes the metal foil and a base. In addition, the shield member has the plurality of slits, and is formed to be wrapped at least twice as a whole so that the plurality of slits do not overlap with each other.

Figure 1:
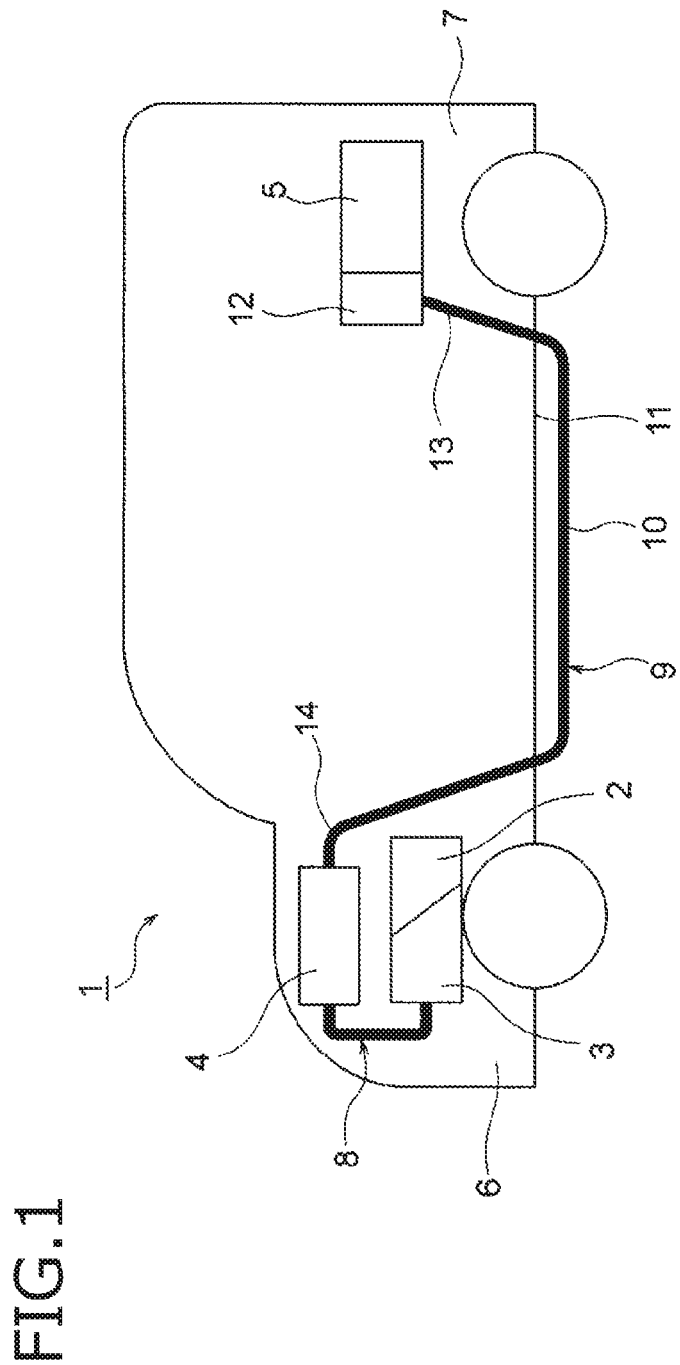
FIG. 1 A schematic view showing an arrangement state of a wire harness according to an embodiment of the invention.
Figure 2:
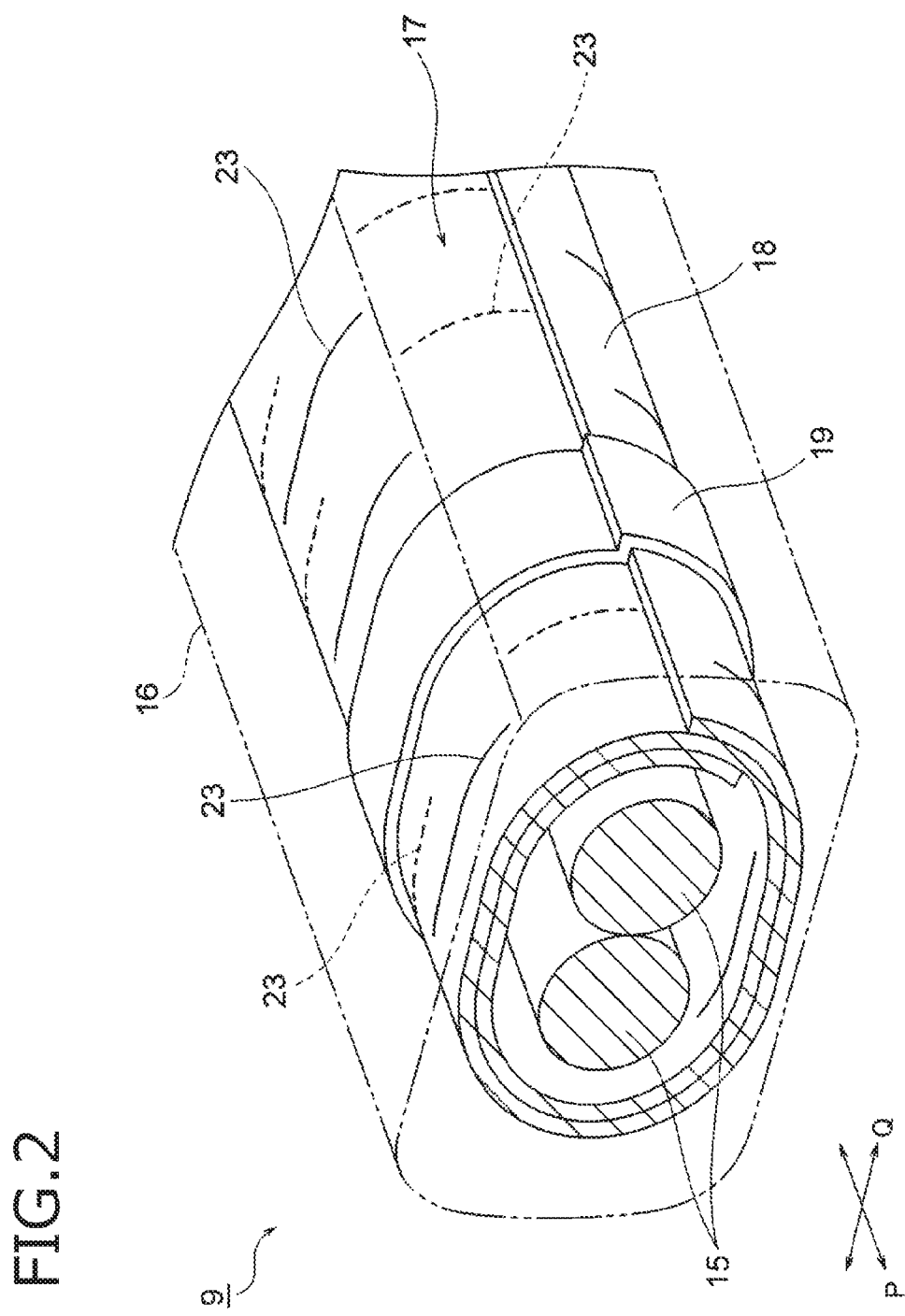
FIG. 2 A perspective view (including a sectional view) showing configuration of the wire harness.
Figure 3:
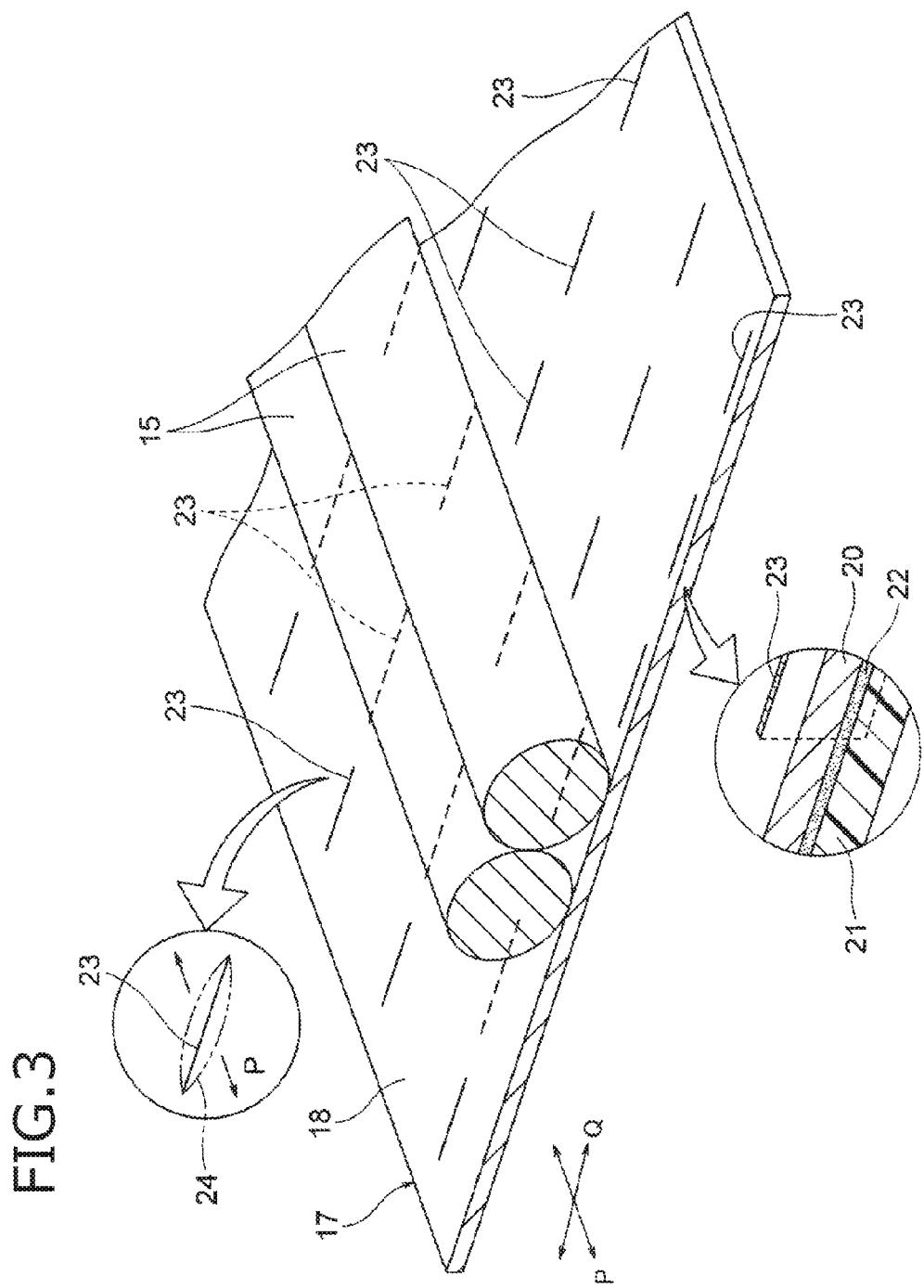
FIG. 3 A perspective view of a metal foil shield member.

A wire harness according to an embodiment will be described below with reference to the drawings. FIG. 1 is a schematic view showing an arrangement state of the wire harness according to the embodiment of the invention. FIG. 2 is a perspective view showing configuration of the wire harness. FIG. 3 is a perspective view of a metal foil shield member.

In the embodiment, the invention is used for the wire harness arranged in a hybrid car (which may be replaced by an electric car or a general car).

In FIG. 1, a hybrid car 1 is a vehicle which is driven by a mixture of two motive powers of an engine 2 and a motor unit 3. Electric power from a battery 5 (battery pack) is supplied to the motor unit 3 through an inverter unit 4. The engine 2, the motor unit 3 and the inverter unit 4 are mounted in an engine room 6 where front wheels etc. are located in the embodiment. In addition, the battery 5 is mounted in a car rear portion 7 where rear wheels etc. are located. Incidentally, the battery 5 may be mounted in a car cabin located at the rear of the engine room 6.

The motor unit 3 and the inverter unit 4 are connected to each other through a high-voltage wire harness 8. In addition, the battery 5 and the inverter unit 4 are also connected to each other through a high-voltage wire harness 9. An intermediate portion 10 of the wire harness 9 is arranged on a vehicle underfloor 11. In addition, the intermediate portion 10 of the wire harness 9 is arranged along the vehicle underfloor 11 and substantially in parallel therewith. The vehicle underfloor 11 serves as a well-known body and as a so-called panel member, in which through holes are formed in predetermined positions. The wire harness 9 is inserted through the through holes watertightly.

The wire harness 9 and the battery 5 are connected to each other through a junction block 12 provided in the battery 5. A rear end 13 of the wire harness 9 is electrically connected to the junction block 12 by a well known method. A front end 14 of the wire harness 9 is electrically connected to the inverter unit 4 by the well known method.

The motor unit 3 functions as a motor and a generator. In addition, the inverter unit 4 includes an inverter and a converter. The motor unit 3 is formed as a motor assembly which includes a shield case. In addition, the inverter unit 4 is also formed as an inverter assembly including a shield case. The battery 5 is modularized as an Ni-MH type battery or an Li-ion type battery. Incidentally, for example, an electric storage device such as a capacitor may be used as the battery 5. The battery 5 is not limited particularly as long as the battery 5 can be used in the hybrid car 1 or an electric car.

In FIG. 2, the wire harness 9 is configured to include two high-voltage conducting paths 15 (conducting paths), an exterior member 16 which receives and protects the high-voltage conducting paths 15, and a metal foil shield member 17 (shield member) which covers and shields the high-voltage conducting paths 15 collectively. Incidentally, the number of high-voltage conducting paths 15 is simply exemplified but may be one.

Incidentally, the wire harness 9 may have a configuration and a structure in which low-voltage conducting paths together with the high-voltage conducting paths 15 are received and protected by the exterior member 16.

Although the wire harness 9 has been described by way of example in the embodiment, the invention can be also applied to the wire harness 8 (see FIG. 1) referred to as so-called motor cable.

The high-voltage conducting paths 15 serve as conducting paths used for high voltage. Each of the high-voltage conducting paths 15 is formed to have a necessary length for electric connection. Specifically, the wire harness 9 is formed to be long enough for making electric connection (see FIG. 1) between the inverter unit 4 and the battery 5 (the junction block 12). Each of the high-voltage conducting paths 15 is provided with a conductor and an insulator with which the conductor is covered.

The conductor is made of copper, a copper alloy, aluminum or an aluminum alloy. The conductor may have a conductor structure formed by twisted strands, or a rod-like conductor structure formed into a rectangular shape or a round shape in section (e.g. a conductor structure as a square single core or a round single core. In this case, the electric wire itself is also shaped like a rod). In addition, an insulator made of an insulating resin material is formed on an outer surface of the conductor by extrusion molding.

The high-voltage conducting path 15 is constituted by a well-known high-voltage electric wire, a bus bar provided with an insulator, or the like. However, the high-voltage conducting path 15 is not limited particularly. The number of such high-voltage conducting paths 15 is one or plural. In addition, the high-voltage conducting path 15 may be a high-voltage coaxial combined conducting path which is configured so that a plus circuit and a minus circuit are provided coaxially in one conducting path or so that three or more circuits are provided coaxially in one conducting path.

The exterior member 16 is a resin tube body which covers the high-voltage conducting paths 15. The exterior member 16 has a necessary length for inserting and receiving the high-voltage conducting paths 15 therein, and a necessary thickness for protecting the high-voltage conducting paths 15. The exterior member 16 is formed as a long member which passes along the vehicle underfloor 11 (see FIG. 1) to extend between a front part and a rear part of the vehicle underfloor 11. Incidentally, the material of the exterior member 16 is not limited to resin but may be metal.

The exterior member 16 has a flexible tube portion and a straight tube portion. The flexible tube portion serves as a portion to be arranged in a bending manner. The straight tube portion serves as a portion to be arranged straight. The exterior member 16 has one or more flexible tube portions and one or more straight tube portions. The flexible tube portions and the straight tube portions are formed to be disposed alternately to each other. The exterior member 16 is formed so that the flexible tube portions and the straight tube portions can be disposed linearly in a state where the flexible tube portions are not bent. The exterior member 16 is substantially formed into a rectangular shape, a circular shape, an oval shape, an elliptical shape, etc. in section. Accordingly, the sectional shape of the exterior member 16 may be selected suitably in accordance with its application.

In addition to the aforementioned one, the exterior member 16 may be a well-known corrugated tube, a well-known protector, etc. The exterior member 16 is disposed on an outer side of the metal foil shield member 17 as illustrated.

In FIG. 2 and FIG. 3, the metal foil shield member 17 includes a flexible sheet-like shield member body 18, and a retention member 19 which is used after the shield member body 18 is wrapped around the high-voltage conducting paths 15. The metal foil shield member 17 is a member for shielding as described above. For example, the metal foil shield member 17 is connected to a shield case of a high voltage device through a shield connector provided at a terminal end of the high-voltage conducting paths 15. Incidentally, the configuration is exemplified but may be grounded, for example, by a well-known unit such as a drain wire.

In the embodiment, the shield member body 18 is formed to be large in size enough to be wrapped around the two high-voltage conducting paths 15 twice over the entire length. Incidentally, the size is not limited as long as the size is large enough to be wrapped around the two high-voltage conducting paths 15 at least twice. In addition, although a state in which the shield member body 18 is wrapped loosely with a space between the shield member body 18 and the two high-voltage conducting paths 15 is shown in FIG. 2, it is a matter of course that the shield member body 18 may be wrapped around the two high-voltage conducting paths 15 tightly.

The shield member body 18 includes a metal foil 20, a base 21, and an adhesive layer 22 bonding the metal foil 20 and the base 21 to each other. In the embodiment, the metal foil 20 is disposed on a side closer to the high-voltage conducting paths 15. Incidentally, a plating layer may be included additionally in the aforementioned configuration. Alternatively, the shield member body 18 may be configured in such a manner that the metal foil 20 is used alone without using the base 21.

The metal foil 20 may be a conductive foil made of copper, a copper alloy, aluminum, an aluminum alloy, iron, etc. The metal foil 20 is used as a portion which can exert a shielding function. The thickness of the metal foil 20 can be set suitably. In addition, the size of the metal foil 20 can be formed in line with the size of the base 21.

The base 21 is a portion which serves as the base of the shield member body 18. Any suitable material may be used for the base 21. Examples of the suitable material of the base 21 include a PET sheet made of polyethylene terephthalate, a polyester sheet, acetate cloth, polyester cloth, glass cloth, insulating paper, PET woven fabric, etc.

A plurality of slits 23 are formed in the aforementioned shield member body 18. The plurality of slits 23 are formed in order to give extensibility to the shield member body 18. The plurality of slits 23 are formed and disposed in places so as not to overlap with each other vertically when the shield member body 18 is wrapped around the two high-voltage conducting paths 15 twice.

The reason why the plurality of slits 23 are disposed so as not to overlap with each other vertically when the shield member body 18 is wrapped around the two high-voltage conducting paths 15 twice will be described. That is, even if, for example, the slits 23 in an outer-layer metal foil part 20 of the doubly wrapped metal foil 20 are opened when the wire harness 9 is bent, the slits 23 in an inner-layer metal foil part 20 can be prevented from being located in the same positions of the opened slits 23. Thus, the high-voltage conducting paths 15 can be prevented from being exposed. In other words, deterioration of shielding performance can be prevented.

The plurality of slits 23 are formed so that the slits 23 are in a closed state when the wire harness 9 is set in a straight state, and the slits 23 are changed to openings 24 indicated by a chain double-dashed line by a force of a direction of an arrow P in a bent portion of the wire harness 9 when the wire harness 9 is bent (not shown). In addition, the plurality of slits 23 are formed to pierce through the shield member body 18 in the thickness direction. Incidentally, the plurality of slits 23 may be formed only in the metal foil 20 when the base 21 per se has extensibility.

In the embodiment, the plurality of slits 23 are formed to be cut in a perpendicular direction (a direction of an arrow Q) to the axis of the high-voltage conducting path 15. In addition, the plurality of slits 23 are formed and disposed to be laid in the perpendicular direction to the axis. Further, the slits 23 laid in such a cut direction are formed and disposed at predetermined pitches in the axial direction (the direction of the arrow P) of the high-voltage conducting path 15. The plurality of slits 23 are formed and disposed so that, of the doubly wrapped metal foil 20, the places of the slits 23 in the outer-layer metal foil part 20 and the places of the slits 23 in the inner-layer metal foil part 20 are different from one another.

As another configuration than the aforementioned one, the plurality of slits 23 may be disposed obliquely to be laid in a direction intersecting the axial direction (the direction of the arrow P) of the high-voltage conducting path 15. In addition, each of the slits 23 may not have the shape of a straight line as illustrated, but may have the shape of a wave, the shape of the cross etc. Further, the plurality of slits 23 may be formed and disposed in zigzag.

The plurality of slits 23 are preferably formed to be closed when no external force is applied thereto. However, since the plurality of slits 23 are formed and disposed so as not to overlap with each other vertically, the plurality of slits 23 may be not closed.

Incidentally, as long as the bent position of the wire harness 9 can be known in advance, the slits 23 may be formed and disposed only in the bent position.

In the embodiment, wrapping is performed twice so that the shield member body 18 is formed in a doubly wrapped state. According to another example, the shield member body 18 may be formed in such a manner that two sheets are superimposed on each other and then wrapped once. The "doubly wrapped state" is not limited particularly as long as the high-voltage conducting paths 15 can be prevented from being exposed due to bending etc. of the wire harness 9. Although not shown particularly, for example, the shield member body 18 may be formed to be wrapped at least twice in a longitudinal lapping manner.

Return to FIG. 2. The retention member 19 is a member for retaining the shield member body 18 which is in a "doubly wrapped state". Examples of the retention include retention performed by taping (tape wrapping), retention performed by a clamp, or retention performed by a binding band, etc. In the embodiment, taping is used and such a retention member 19 is provided in a suitable position.

As described above with reference to FIGS. 1 to 3, the structure of the shield member body 18 (the structure of the metal foil shield member 17) can prevent the high-voltage conducting paths 15 from being exposed even when the wire harness 9 is bent. Accordingly, there is obtained an effect that deterioration of shielding performance can be prevented. In other words, there is obtained an effect that a shielding effect can be secured satisfactorily even when the wire harness 9 is bent.

There is also obtained an effect that the metal foil shield member 17 can achieve weight reduction while securing the shielding effect due to the metal foil 20.

Here, the aforementioned characteristics of the embodiment of the wire harness according to the invention will be summarized and listed briefly in the following configurations [1] and [2].

[1] A wire harness (9) including:
a conducting path (15); and
a shield member (17) which covers and shields the conducting path (15),
wherein the shield member (17) includes a metal foil (20) having a plurality of slits (23), and the shield member (17) being wrapped around the conducting path (15) at least twice to cover the conducting path (15); and
wherein the plurality of slits (23) are disposed in positions so as not to overlap with each other in a state that the shield member (17) covers the conducting paths (15).

[2] The wire harness (9) according to the configuration [1], wherein each of the plurality of slits (23) is formed into a cut shape which is opened in response to a bending of the wire harness (9).

The invention has been described in detail and with reference to a specific embodiment. However, it is obvious to those skilled in the art that the invention can be changed or modified variously without departing from the spirit and scope of the invention.

The present application is based on a Japanese patent application (Patent Application No. 2013-142289) filed on Jul. 8, 2013, the contents of which are incorporated herein by reference.

INDUSTRIAL APPLICABILITY

According to the invention, there is obtained an effect that a shielding effect can be maintained even when the wire harness is bent. The invention obtaining the effect is useful for a wire harness which is configured to include conducting paths, a shield member and an exterior member.

REFERENCE SIGNS LIST 1 hybrid car
2 engine
3 motor unit
4 inverter unit
5 battery
6 engine room
7 car rear portion
8, 9 wire harness
10 intermediate portion
11 vehicle underfloor
12 junction block
13 rear end
14 front end
15 high-voltage conducting path (conducting path)
16 exterior member
17 metal foil shield member (shield member)
18 shield member body
19 retention member
20 metal foil
21 base
22 adhesive layer
23 slit
24 opening

The invention claimed is:

1. A wire harness comprising:
a conducting path; and
a shield member that covers and shields the conducting path,
wherein the shield member comprises a metal foil having a plurality of slits, and the shield member being wrapped around the conducting path at least twice to cover the conducting path; and
wherein the plurality of slits are disposed in positions so as not to overlap with each other in a state that the shield member covers the conducting path.

2. The wire harness according to claim 1, wherein each of the plurality of slits is formed into a cut shape which is opened in response to a bending of the wire harness.

* * * * *